US008777119B2

(12) United States Patent
Griffin et al.

(10) Patent No.: US 8,777,119 B2
(45) Date of Patent: Jul. 15, 2014

(54) HEATED MAKEUP AIR UNIT

(75) Inventors: William Brian Griffin, Columbia, PA (US); Brandon Charles Wellington, Philadelphia, PA (US)

(73) Assignee: Captive-Aire Systems, Inc., Raleigh, NC (US)

( * ) Notice: Subject to any disclaimer, the term of this patent is extended or adjusted under 35 U.S.C. 154(b) by 1281 days.

(21) Appl. No.: 12/572,787

(22) Filed: Oct. 2, 2009

(65) Prior Publication Data

US 2011/0079653 A1 Apr. 7, 2011

(51) Int. Cl.
| | |
|---|---|
| F24D 5/00 | (2006.01) |
| F23N 5/02 | (2006.01) |
| F23N 1/02 | (2006.01) |
| F24D 5/02 | (2006.01) |
| F24D 19/10 | (2006.01) |
| F23N 5/00 | (2006.01) |
| F23N 5/26 | (2006.01) |
| G05D 23/00 | (2006.01) |

(52) U.S. Cl.
CPC ............. *F23N 1/022* (2013.01); *F23N 2025/12* (2013.01); *F23N 5/022* (2013.01); *F23N 2035/16* (2013.01); *F23N 2041/02* (2013.01); *F24D 2200/043* (2013.01); *F23N 2033/08* (2013.01); *F24D 5/02* (2013.01); *Y02B 30/108* (2013.01); *F24D 19/1084* (2013.01); *F23N 2037/02* (2013.01)
USPC ............... 237/53; 237/81; 110/191; 700/276; 431/12

(58) Field of Classification Search
USPC .......... 237/53, 81; 110/191; 700/276; 431/12
See application file for complete search history.

(56) References Cited

U.S. PATENT DOCUMENTS

| 4,252,300 A | 2/1981 | Herder |
| 5,524,556 A * | 6/1996 | Rowlette et al. .............. 110/162 |

(Continued)

FOREIGN PATENT DOCUMENTS

| DE | 19623239 A1 | 12/1997 |
| DE | 102007002673 B3 | 8/2008 |

OTHER PUBLICATIONS

2008 ASHRAE Handbook, "Heating, Ventilating, and Air-Conditioning Systems and Equipment," Inch-Pound Edition, 2008, p. 32.1.*

(Continued)

*Primary Examiner* — Kang Hu
*Assistant Examiner* — Phillip E Decker
(74) *Attorney, Agent, or Firm* — Coats and Bennett, PLLC

(57) ABSTRACT

A heated air makeup unit comprising a heating chamber with a modulated furnace one or more non-modulated furnaces air temperature control and efficient furnace operation over a wide heating rate range. The utilization of indirect fired furnaces in the heated air makeup unit is disclosed. A control system is included to provide control of heated air temperature to within +/−1 F.° using continuous control of the heating rate of the modulated furnace and stepwise activation and de-activation of the non-modulated furnaces in response to heating demand. A programmed combustion air flow controller programmed to provide optimal airflow for any gas flow in a flow range of a modulating gas valve is provided to assure combustion efficiencies of at least 83%.

20 Claims, 2 Drawing Sheets

(56) References Cited

U.S. PATENT DOCUMENTS

| | | | |
|---|---|---|---|
| 5,771,879 A | 6/1998 | Saltzman | |
| 5,997,280 A * | 12/1999 | Welz et al. | 431/90 |
| 6,109,255 A | 8/2000 | Dieckmann et al. | |
| 6,161,535 A | 12/2000 | Dempsey et al. | |
| 6,377,426 B2 * | 4/2002 | Hugghins et al. | 361/23 |
| 8,075,304 B2 * | 12/2011 | Cox et al. | 431/90 |
| 2002/0155405 A1 | 10/2002 | Casey | |
| 2006/0199121 A1 * | 9/2006 | Caskey | 431/12 |
| 2008/0182214 A1 * | 7/2008 | Cox et al. | 431/12 |

OTHER PUBLICATIONS

Greenheck Models IG/IGX Make-Up Air Unit, "Installation, Operation and Maintenance Manual," downloaded from http://web.archive.org/web/20090913080551/http://greenheck.com/products/detail/55, Sep. 13, 2009.*

International Preliminary Report on Patentability mailed Jan. 25, 2013 in re PCT Application No. PCT/US10/46048 filed Aug. 20, 2010.

* cited by examiner

HEATED MAKEUP AIR UNIT

FIELD OF THE INVENTION

The present invention generally relates to a heated makeup air unit for heating outside air and directing the heated outside air into a room or building to replace air exhausted therefrom.

BACKGROUND

Buildings or rooms comprising commercial kitchens, research laboratories, and industrial installations often include one or more exhaust fans that vent smoke, steam, and other air-polluting substances from areas where cooking units, chemical process, or manufacturing operations are located. To replace the exhausted air, heated makeup air devices are used to heat and introduce outside air into the building or room. These heated makeup air devices basically consist of a duct structure open to both the outside atmosphere and the building or room, a fan for blowing air through the duct structure into the building or room, heating units to heat the outside air as needed, and a control system for activating and monitoring the heater makeup air device as needed.

In some situations, amount of heating needed to heat outside air before introducing the air into the building or room varies widely over relatively short periods of time. For example, in some climates and at some times of the year, outside air temperatures may be very low in the morning as compared to the desired air temperature within the building or room. However, later in the day, the outside air temperature may rise considerably, perhaps up to about the desired air temperature in the building or room. At night, outside temperatures may again drop significantly. This situation requires highly variable heating rates throughout the day, and it is often the case that heated air makeup units are sized based on the highest heating demand. Likewise, venting requirements may vary over relatively short periods of time. For example, in a restaurant the intensity of cooking activities varies as dining customers come and go. While during a meal rush, venting of cooking fumes is done at a high rate and heated makeup air is consequently needed at a high level, during another period there may be little need for venting and the demand for heated makeup air is consequently low.

In most cases the air in the building or room is conditioned by a building or room heating system that is not interconnected with the heated makeup air unit The degree to which a heated air makeup device functions adequately can have a major bearing on heating load and heating load changes on the building or room air heating system. If heated makeup air is provided at temperatures varying even a little from the control target temperature of the building or room heating system, inefficient cycling of the building or room heating system can occur. However, providing precise control of the temperature of heated make up air using a very high capacity heating unit can be difficult and expensive. Moreover, actively varying the heating rate of a large heated air makeup unit often results inefficient energy conversion in the unit.

There is a need for heated air makeup devices which provide precise control of makeup air temperature and can operate efficiently over wide heating rate ranges.

SUMMARY OF THE INVENTION

The present invention relates to a heated makeup air system comprising a furnace unit and a control system for controlling the furnace unit. The furnace unit includes one or more non-modulated gas furnaces and one modulated gas furnace. The control system is operative to provide course control by actuating or de-actuating one or more of the non-modulated gas furnaces. Fine or Vernier control is exercised by modulating the modulated gas furnace. Therefore, when the heat demand can be met with the capacity of the modulated furnace, the control system simply relies on the modulated furnace. When the heat demand cannot be met with the modulated furnace, then the control system relies on one or more of the non-modulated furnaces.

In one embodiment, the control system includes a controller. The function of the controller is to modulate the modulated furnace, control the activation and deactivation of the non-modulated furnaces, and, at the same time, maintain the combustion efficiency of the total system at a selected level such as 83% or better.

In one embodiment, the controller of the control system directs one control signal to a power vent and a modulation gas valve associated with the modulated gas furnace. The control signal effectively controls the flow of combustion air into the modulated furnace and, by controlling the modulating gas valve, controls the flow of gas into the modulated furnace and is therefore effective to vary the heat output of the modulated furnace.

Other objects and advantages of the present invention will become apparent and obvious from a study of the following description and the accompanying drawings which are merely illustrative of such invention.

DESCRIPTION OF THE INVENTION

Figure 1:
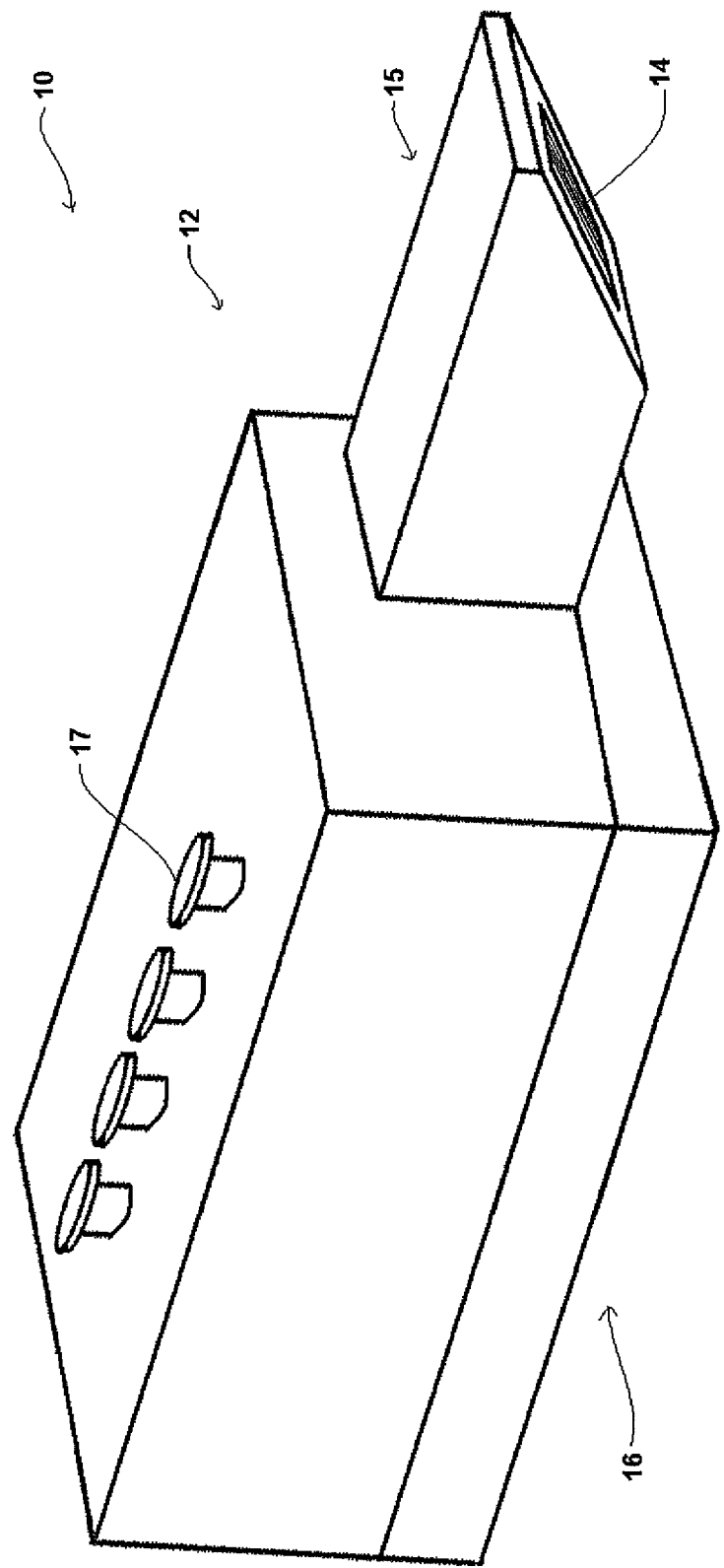
FIG. 1 is a pictorial view of a heated air makeup unit.

A typical heated air makeup unit generally includes a furnace unit through which outside air is passed and heated before supplying it to a heated space such as a room or building to make up for lost heated air from the room or building. Such a heated air makeup unit is typically configured to be installed on a roof or outer wall of a building and connected by appropriate ducting to the heated space serviced by heated air makeup unit. The furnace unit typically includes a housing enclosing a heating chamber fitted with one or more furnaces. The housing includes an air intake and an air discharge so that unheated outside air can be directed into the heating chamber by way of the air intake, heated by the one or more furnaces in the heating chamber, and discharged into the room or building serviced by the heated air makeup air unit. Applications for heated air make up units include buildings or rooms where there are air exhausting systems operating to exhaust dangerous or objectionable byproducts of processes ongoing in the room or building. One example is a commercial kitchen where one or more large exhaust hoods operate to exhaust cooking smoke and fumes from the spaces over cooktop units. Other examples include industrial and laboratory installations where fume hoods or other air exhausting systems are utilized in connection with various operations which may produce dangerous or objectionable airborne materials. For a more complete and detailed description of heated air makeup units and applications, reference is made to U.S. Pat. No. 5,771,879 the disclosure of which is expressly included herein by reference.

The heated air make up unit of the present invention, indicated generally by the numeral 10 in the accompanying drawings, includes a housing 12 with a heating chamber 18 enclosed therein. Housing 12 includes a makeup air intake 14, which may form a part of a makeup air intake assembly 15. Makeup air intake assembly 15 includes a fan or blower for inducing air flow through heated air makeup unit 10. Housing 12 further includes a heated air discharge 16 through which air heated by heated air makeup unit 10 is directed to a room or building space requiring heated air makeup. Extending from housing 12 are one or combustion vent rain caps 17 through which fuel combustion byproducts may be exhausted from heated makeup air unit 10.

Figure 2:
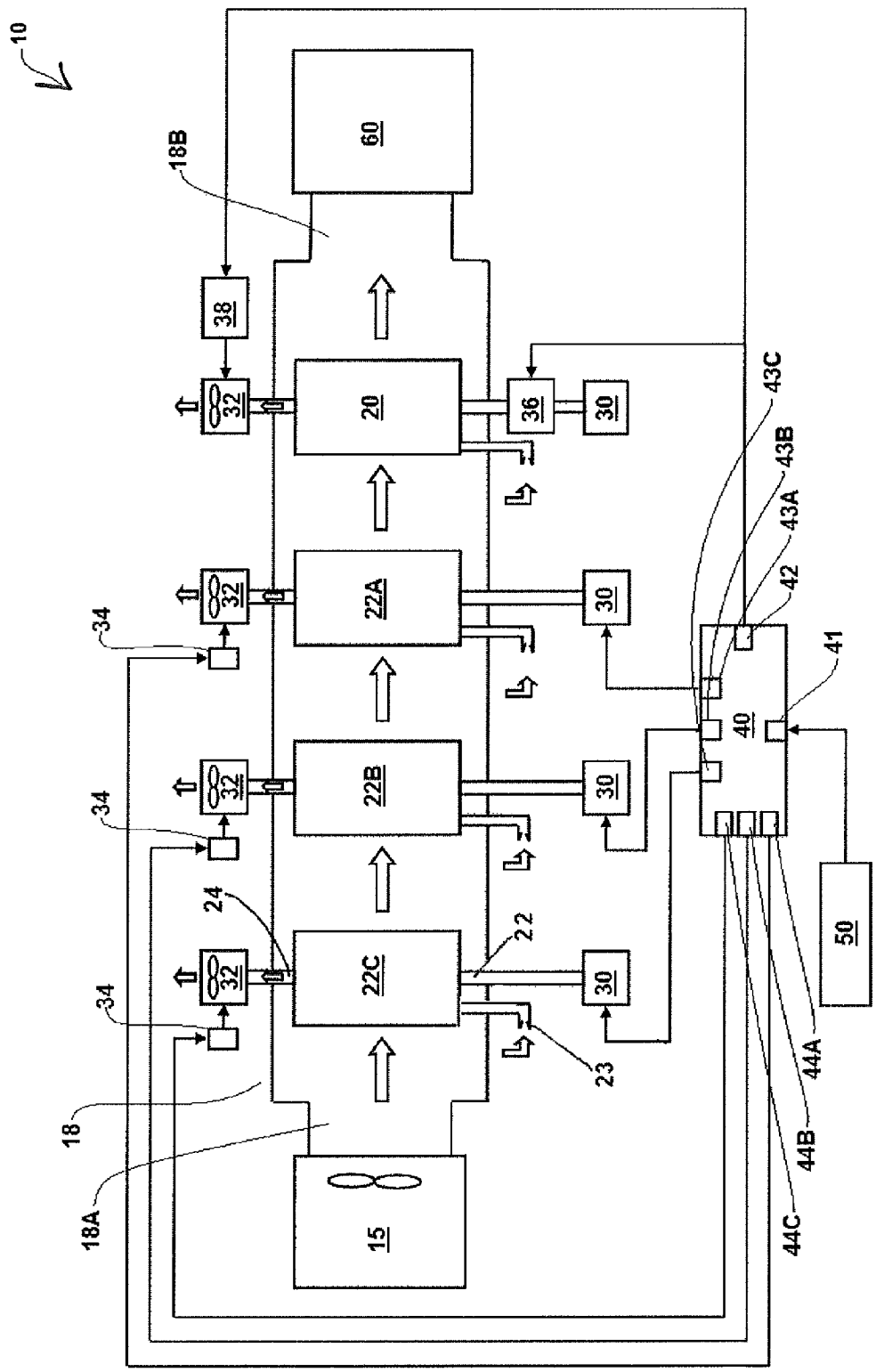
FIG. 2 is a schematic representation of a heated air makeup unit.

The heated air makeup unit 10 of the present invention also includes a control system configured to enable heating air to a desired temperature while assuring efficient conversion of heating fuel energy to heat for warming the air. Before discussing the control system in detail, heating and air flow components and their interconnections to form the heated air makeup unit will be discussed Heating chamber 18 is in one embodiment comprised of an insulated duct with an air inlet 18A for receiving air to be heated from makeup air intake unit 15 and directing the received incoming air stream into the heating chamber. A modulated furnace 20 is disposed in heating chamber 18. One or more non-modulated furnaces may also be disposed in heating chamber 18 upstream of a modulated furnace 20. For purposes of explanation, three non-modulated furnaces 22A, 22B, and 22C are illustrated in FIG. 2. The incoming airstream is directed to and about furnaces 20 and 22A, 22B, and 22C where the air may be heated. Heating chamber 18 also includes a heated air outlet or discharge 18B for directing the heated air stream to heated space 60 of a room or building serviced by the heated air makeup unit 10. Modulated furnace 20 and, when included, non-modulated furnaces 22A-C are managed by a control system to be described below so as to provide the required heat to warm the makeup airstream.

The furnaces, whether modulated 20 or non-modulated 22A-C, may be of a common design, each having the same rated maximum heating capacity as the others. In one embodiment, furnaces 20, 22A-C are indirect fired gas furnaces, each furnace having a rated maximum heating capacity of 400,000 btu/hr, for example. Each furnace 20, 22A-C includes combustion chamber, a gas inlet 22, a combustion air inlet 23 permitting only inflow of combustion air, and a combustion exhaust outlet 24. In one embodiment combustion air inlets 23 direct air for combustion from the incoming air stream into furnaces 20, 22A-C where the combustion air is mixed with gas received through respective gas inlets 22 and burned in respective combustion chambers to produce heat. Combustion byproducts are exhausted through combustion exhaust outlets 24.

For each of furnaces 20, 22A-C, gas inlet 22 is connected to and in fluid communication with an ON/OFF gas valve 30. The gas valves are supplied with gas from a common source (not shown). Gas valves 30 are electrically actuated valves of well known design and operable in a binary manner to provide no gas flow when in the OFF mode and full gas flow when in the ON mode. Valves 30 are selected such that full gas flow will support respective rated maximum heating capacity of each of the non-modulated furnaces 22A-C. To provide optimal combustion air flow for maximum combustion efficiency, a power vent 32 is connected to and in fluid communication with a combustion exhaust outlet 24 of each of furnaces 20, 22A-C. Each power vent 32 includes a fan or blower powered by an electric motor, and each power vent is covered by one of the rain caps 17. Power vent 32 is sized so that when the power vent and gas valve 30 are both in the ON mode with full gas flow entering each of the combustion chambers, an appropriate rate of combustion air flow is provided to assure an 83% or greater combustion efficiency in one particular embodiment. Each power vent 32 that is connected to one of the non-modulated furnaces 22A-C is connected to an electric motor ON/OFF control or relay 34 for activating or deactivating the fan or blower of the power vent.

As noted above, in one embodiment modulated furnace 20 has the same rated maximum heating capacity as do each of any included non-modulated furnaces 22A-C. However, modulated furnace 20 is configured to operate differently from non-modulated furnaces 22A-C. In particular, modulated furnace 20 is configured to operate in a variable heating rate mode where the heating rate may be selectively varied from a minimum fire heat output up to the rated maximum heat capacity of the furnace. To enable varying the heating rate of modulated furnace 20, provision is made to vary both the gas flow rate and the combustion air flow rate to the combustion chamber of the furnace. Varying the gas flow rate is enabled by including a modulating gas valve 36 in series with the ON/OFF gas valve 30 connected to modulating furnace 20. In one embodiment, modulating gas valve 36 is interposed between the ON/OFF gas valve 30 and the combustions chamber of modulating furnace 20, so that gas is enabled to flow through the ON/OFF gas valve and thence through the modulating gas valve. Varying the rate of flow of combustion air into combustion chamber of the modulating furnace 20 is enabled by powering the electric motor of the power vent 32 associated with furnace 20 with a power vent speed control 38.

Modulating gas valve 36 is a of a common design having a flow capacity that in one embodiment varies in response to a 0-10 V DC signal applied to electric terminals thereof. For example, when the voltage supplied to modulating gas valve 36 is 0 V DC, a minimum gas flow is permitted through the valve while when the voltage supplied to the valve is 10 V DC, the maximum rated flow of gas is permitted through the valve. At a voltage between 0 and 10 V DC is supplied to the valve, the gas flow permitted will be at a flow rate corresponding to that voltage. Power vent speed control unit 38 is a programmable motor speed control that accepts an input signal in the 0-10 V DC range and produces an AC power output voltage that increases from a minimum AC voltage, when the input signal is 0 V DC along a programmed trajectory of input signal values up to a maximum AC voltage, when the input signal is 10 V DC. The trajectory programmed into power vent speed control unit 38 is determined such that for any level of an input signal supplied simultaneously to the speed control and modulating gas valve 36, the combustion air and gas flow rates into combustion chamber will be at values to produce combustion efficiency of 83% or better. The trajectory may be determined by experiment. Once determined, the trajectory is programmed into power vent speed control unit 38.

Heated makeup air unit 10, configured as described above has a maximum heating capacity that is the sum of the maximum heating capacities of modulated furnace 20 and the non-modulated furnaces, furnaces 22A-C in the example of a unit having three non-modulated furnaces. As stated above, the maximum capacities of the individual furnaces comprised in makeup air unit 10 are generally the same. For example, modulated furnace 20 and non-modulated furnaces 22A-C, might each typically have a maximum capacity of 400,000 btu/hr. In such a case, the maximum heating capacity of heated makeup air unit 10 would be four times that of an individual furnace of 1,600,000 btu/hr. Said another way, heated makeup air unit 10 can be operated to provide a varying heating rate to meet an instantaneous heating demand that can be anywhere between a minimum rate and 1,600,000 btu/hr. It would be said that heated makeup air unit 10 has a 1,600,000 btu/hr range. Modulated furnace 20 can be operated, in this example, to provide a varying heating rate to meet instantaneous heating requirement on that furnace that can be anywhere between a minimum rate and 400,000 btu/hr, or that the furnace provides one fourth of the range of unit 10. Each of the non-modulated furnaces 20A-C, can be operated only at full rated capacity, or 400,000 btu/hr. That is, each non-modulated furnace 20A-C can be operated to either produce no heat or to produce heat at its maximum rated capacity. Each non-modulated furnace 22A-C, provides one fourth of the range of unit 10.

A control system is embodied in heated makeup air unit 10 that enables continuously varying the heating rate of the makeup air unit over its range, a minimum rate to 1,600,000 btu/hr, for example, by continuously varying only the heating rate of furnace 20 and selectively activating or de-activating one or more of non-modulated furnaces 20A-C based on the instantaneous heating demand from unit 10. That is, when the heating demand on heated air makeup unit 10 varies between a minimum rate and 400,000 btu/hr, the heating demand is met by varying the heating rate of modulated furnace 20 over its range. When the heating demand is, for example, as much as 400,000 btu/hr and up to 800,000 btu/hr, non-modulated furnace 22A is activated to supply 400,000 btu/hr while modulated furnace 20 produces a varying heating rate between 0 and 400,000 btu/hr so that the two furnaces together meet any heating demand from 400,000 btu/ht and 800,000 btu/hr. Should the heating demand rise to as much as 800,000 btu/hr, non-modulated furnace 22B is activated to supply 400,000 btu/hr while non-modulated furnace 22A continues to supply 400,000 btu/hr and modulated furnace 20 supplies heat at a varying rate of 0 to 400,000 btu/hr. The three furnaces 20, 22A, and 22B then operate together to supply heat at a rate of 800,000 btu/hr up to 1,200,000 btu/hr. In the same manner non-modulating furnace 22C is added so that unit 10 operates to meet a heating demand varying between 1,200,000 and 1,600,000 btu/hr. Similarly, as heating demand falls to the lower end of the range in which furnace 20 is supplying heat, one or more of the of non-modulated furnaces 22A-C is deactivated. Thus, the control system of heated air makeup unit 10 functions to continuously or more finely control total heating rate on a sub-range, that of modulated furnace 20, and to shift the sub-range as required based on heating demand within the range of the unit by selectively, or in a stepwise fashion, activating or deactivating non-modulated furnaces 20A-C.

Various implementations of the above-described control system could be utilized, ranging from alarm-based manual range shifting to a microprocessor that includes memory or other storage for holding computer program instructions, the execution of which configures the microprocessor to carry out the control logic for controlling the furnace unit. In one embodiment, the control system embodied in heated makeup air unit 10, the control system comprises a command signal generator 50 that produces a DC signal ranging from 0-10V DC, where 0 V is indicative of no heat demand and 10 V is indicative of maximum heat demand. Command signal generator 50 may take any of various forms.

One embodiment implements discharge control. For this embodiment, the command signal generator 50 comprises a manually settable thermostat with a temperature sensor disposed in discharge 18B of heated makeup air unit 10 and an output signal range of 0-10 V DC. In this embodiment, the thermostat is manually set for a desired discharge air temperature $T_D$. The thermostat compares the temperature $T_S$ of discharge air sensed by the discharge sensor. When the $T_S$ equals $T_D$, the output signal of the thermostat assumes a value of 0 V DC. If $T_S$ is less than $T_D$, the output signal assumes a value within the 0-10 V DC range. The greater the difference $[T_D-T_S]$, the larger the output voltage. The thermostat has a control range that is the maximum difference $[T_D-T_S]$ for which the thermostat will function. When $[T_D-T_S]$ assumes the control range maximum, the output voltage of the thermostat assumes a value of 10 V DC.

Another embodiment implements space control in which the air temperature of the room or building is controlled by a manual thermostat of the general type described above for discharge control, but where sensed temperature $T_S$ is the room or building air temperature. The 0-10 V DC command signal is generated as described above for the discharge control embodiment.

Yet another embodiment is configured to interact with a building automation control system where the system provides a 0-10 V DC signal indicative of heat demand based on air temperature and other variables sensed by the system. In any case, the control system is provided a DC signal that varies between 0 and 10 V DC. The signal assumes a value of 0 V DC to indicate that generally no heating is demanded of heated makeup air unit 10, and the signal assumes a value of 10 V DC to indicate that heating at the maximum available rate is demanded of the unit. When the signal successively assumes values increasing or decreasing between 0 and 10 V DC, heating rate is demanded successively and correspondingly increased or decreased levels less than the maximum available rate.

However the 0-10 V DC command signal is generated, the signal is utilized by the control system to control the heating rate of heated makeup air unit 10. While it is appreciated that heated makeup air unit 10 includes one modulated furnace and possibly a plurality of non-modulated furnaces, the control system for a typical installation with modulated furnace 20 and three non-modulated furnaces 22A-C embodies and illustrates the same functionality with any number of furnaces and will be use as a basis for describing the control system.

The control system further includes the gas valves 30 and power vent relays 34 that are associated with non-modulated furnaces 22A-C and modulated gas valve 36 and power vent blower motor speed control 38 interconnected as here above described. Also included is an electronic modulation step controller 40 as shown in FIG. 2. Controller 40 includes a command signal input 41 and a command signal control output 42. Also included in controller 40 are a series of gas valve control outputs 43A, 43B, and 43C and a series of power vent motor relay control outputs 44A, 44B, and 44C. Gas valve control outputs 43A-C are electrically connected to ON/OFF gas valves 30 associated with non-modulated furnaces 22A-C respectively. Relay control outputs 44A-C are connected to relays 34 associated with non-modulated furnaces 22A-C respectively.

Controller 40 includes an electrical conductor that continuously connects command signal input 41 to command signal control output 42. The output of a latching maximum-minimum detecting circuit of well known design is connected to each of gas valve control outputs 43A-C and relay control outputs 44A-C. A sequencing circuit of well known design is selectively connectable between command signal input 41 and the inputs of the latching maximum-minimum detecting circuits. At system startup, the sequencing circuit is connected between command signal input 41 and both gas valve control output 43A and relay control output 44A.

The operation of the control system can be understood and explained by stipulating that at startup, the heat demanded is small but greater than 0. That is, at startup, the command signal is at a value slightly above 0 V DC. When heat demand increases, the command signal increases, increasing both the gas flow and the combustion air flow rates into modulated furnace 20. The heat demand may be satisfied by increasing the heating rate of modulated furnace 20, warming the air and thereby keeping the command signal from reaching its maximum of 10 V DC. In the event that the heat demand is so great as to drive the command signal to its maximum of 10 V DC, the modulated furnace is driven up to its maximum rated capacity, otherwise know as "high fire." The latching maximum-minimum detecting circuit connected between command signal input 41 and both gas valve control output 43A and relay control output 44A detects the attainment of 10 V DC by the command signal, latches in a pre-set command voltage to each of gas valve control output 43A and relay control output 44A to start non-modulated furnace 22A and keep the gas valve ON and the blower of the power vent 32 associated with the furnace running at rated speed. The sequencing circuit of controller 40 connects command signal input 41 to the input of the latching max-min detecting circuit connected to both gas valve control output 43B and relay control output 44B. The heat supplied by the just-started non-modulating furnace 22A immediately begins to increase the heating rate of heated makeup air unit 10, driving $T_S$ upward and thereby driving the command signal downward. Because non-modulated furnace 22A essentially conies on instantly at rated heating capacity, the command signal is driven downward rapidly to about 0 V DC, rapidly lowering the heating rate of modulated furnace 20 to near 0. If, for example, the temperature intake air drops or is so low that with non-modulated furnace 22A operating, there is remaining demand for heat to warm the air, the command signal will increase. As the command signal increases upwards towards 10 V DC, modulated furnace 20 is modulated upwardly, increasing the heating rate until the furnace is a full rated capacity and the command signal reaches its maximum again, 10 V DC. At this point the latching max-min detecting circuit connected to both gas valve control output 43B and relay control output 44B latches in a pre-set command voltage that is directed to each of the valves to fire non-modulated furnace 22B, and the process described after firing furnace 22A repeats. Further heat demand will bring on non-modulating furnace 22C by the same process. It is to be noted that once one of the non-modulated furnaces 22A-C is activated or fired, that furnace remains on and producing heat at its maximum rated capacity until such time as heating demand reduces to an extent that cannot be accommodated by modulating down or reducing the heating rate of modulated furnace 20. As heat demand decreases to a greater extent than can be accommodated by down-modulating modulated furnace 20, non-modulated furnace 22C, followed by non-modulated furnace 22B, and then followed by non-modulated furnace 22A are sequentially de-activated. For example, in a condition where the modulated furnace 20 is operating at essentially 0 capacity in response to the command signal being at 0 V DC, the latching max-min detecting circuit will detect the attainment of 0 V DC by the command signal, and de-latch the pre-set command voltage from gas valve output 43C and relay control output 44C thereby deactivating non-modulated furnace 22C. The abrupt reduction in heat production due to deactivation of non-modulated furnace 22C creates heat demand that drives the command signal upwards, modulating modulated furnace 20 upwards. In the event of continuing overall reduction in heat demand, this process repeats to sequentially de-activate non-modulated furnaces 22B and 22A, leaving modulated furnace 20 on and being modulated to respond to heat demand changes within the capacity of the furnace.

The above-described control system provides the capability to maintain $T_S$ within a range of one F.° below $T_D$ to one F.° above $T_D$, based on two features. First, the control system utilizes the full 0-10 V DC control range to vary the heating rate of modulated furnace 20. This generally prevents greater that 1 F.° departures of $T_S$ from $T_D$ and thereby providing fine control of the heating rate of unit 10. Second, the system operates to sequentially activate or deactivate non-modulated furnaces depending on the heating rate of the modulated furnace at a particular time. The non-modulated furnaces are activated and deactivated in an ON/OFF fashion that provides coarse control of the heating rate of unit 10.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A heated air makeup unit for heating outside air and directing the outside air into an interior space, the heated air makeup unit comprising:
   a. a housing;
   b. a heating chamber disposed in the housing;
   c. a furnace unit disposed in the housing and including a modulated gas furnace and one or more non-modulated gas furnaces;
   d. wherein each of the one or more non-modulated furnaces is operative to function at a substantially constant heating rate and wherein the modulated furnace is operative to function at a varying heating rate;
   e. a combustion air blower and a modulated gas valve associated with the modulated gas furnace, and wherein by controlling the combustion air blower and the modulated gas valve associated with the modulated gas furnace, the heating rate of the modulated furnace can be varied and controlled;
   f. a combustion air blower associated with each non-modulated gas furnace for supplying combustion air to each non-modulated gas furnace;
   g. an air inlet for directing air into the heating chamber;
   h. an air outlet for directing heated air from the heating chamber;
   i. wherein air is directed into the air inlet and past the one or more non-modulated furnaces and the modulated furnace where the air is heated;
   j. a control system for controlling the furnace unit, the control system operative to provide control of the furnace unit by selectively activating or deactivating one or more of the non-modulated furnaces, and operative to provide control of the furnace unit by varying the heating rate of the modulated furnace, the control system including:
      1) a speed control unit operatively connected to the combustion air blower associated with the modulated gas furnace for varying the speed of the combustion air blower and varying the flow of combustion air into the modulated gas furnace; and
      2) a controller having a command signal input for receiving a command signal and for:
         a) actuating and de-actuating the one or more non-modulated gas furnaces;

b) controlling the modulated gas valve associated with the modulated gas furnace and varying the flow of gas to the modulated gas furnace;
c) controlling the speed control unit which, in turn, is operative to control and vary the speed of the combustion air blower associated with the modulated gas furnace; and
d) wherein the controller is operative to provide control of the furnace unit by providing on/off control of the one or more non-modulated gas furnaces and the combustion air blowers thereof, and to provide control of the furnace unit by controlling the gas modulated valve and combustion air blower associated with the modulated gas furnace.

2. The heated air makeup unit of claim 1 wherein one or more of the non-modulated furnaces and the modulated furnace are disposed in series in the heating chamber, and wherein the modulated furnace is disposed downstream of at least one non-modulated furnace.

3. The heated air makeup unit of claim 1 wherein the combustion efficiency of the furnace unit as controlled by the control system is at least approximately 83%.

4. The heated air makeup unit of claim 1 wherein the controller produces at least one control signal that is a function of the command signal and wherein the control signal is directed from the controller to both the modulating gas valve and the speed control unit associated with the modulated gas furnace.

5. The heated air makeup unit of claim 1 wherein the controller is programmed to control the flow of gas from the modulating valve to the modulated gas furnace and to control the speed of the combustion air blower associated with the modulated gas furnace so as to substantially maintain the combustion efficiency of the modulated gas furnace at approximately 83% or higher.

6. The heated air makeup unit of claim 1 wherein the modulated gas furnace includes a heating capacity range and wherein the controller is operative to vary the heat output of the modulated gas furnace over the heating capacity range, and wherein the controller is operative to actuate at least one of the non-modulated gas furnaces in response to the modulated gas furnace reaching an upper portion of the heating capacity range of the modulated gas furnace.

7. The heated air makeup unit of claim 6 wherein the controller is operative to actuate one non-modulated gas furnace after another in response to the modulated gas furnace repeatedly over a selective period of time reaching an upper portion of the heating capacity range of the modulated gas furnace.

8. The heated air makeup unit of claim 6 wherein the controller is operative to deactivate one of the non-modulated gas furnaces in response to the modulated gas furnace reaching a lower portion of the heating capacity range of the modulated gas furnace.

9. The heated air makeup unit of claim 8 wherein the controller is operative to deactivate one non-modulated gas furnace after another in response to the modulated gas furnace repeatedly reaching a lower portion of the heating capacity range of the modulated gas furnace.

10. The heated air makeup unit of claim 1 wherein for a given heat demand, the controller is operative to substantially meet the heat demand by varying the heat output of the modulated gas furnace, or by actuating one or more non-modulated gas furnaces for a selected period and supplying a substantially constant heat output from each of the one or more non-modulated gas furnaces, and at the same time utilizing the modulated gas furnace to supply a variable supply of heat such that during the selected period, the one or more non-modulated gas furnaces and the modulated gas furnace combine to meet the heat demand.

11. The heated air makeup unit of claim 10 wherein the controller is configured to continuously maintain the modulated gas furnace in an on state and to activate and deactivate the one or more non-modulated gas furnaces from time-to-time such that for a given heat demand that is greater than that which can be met by the modulated gas furnace, the controller is operative to cause substantially constant quantities of heat to be supplied by each of the one or more non-modulated gas furnaces and a variable quantity of heat to be supplied by the modulated gas furnace.

12. The heated air makeup unit of claim 11 wherein the controller is configured such that if the given heat demand can be satisfied by the modulated gas furnace, the controller is operative to utilize the modulated gas furnace to the exclusion of the one or more non-modulated gas furnaces.

13. The heated air makeup unit of claim 1 wherein the furnace unit is of a modular construction and includes a series of non-modulated gas furnaces with each non-modulated gas furnace being interchangeable with another non-modulated gas furnace; and wherein except for the modulating valve and speed control unit, the modulated gas furnace is interchangeable with any one of the non-modulated gas furnaces.

14. The heated air makeup unit of claim 1 wherein the controller includes one or more non-modulated furnace outputs for directing a control signal to each of the one or more non-modulated gas furnaces; and wherein the controller includes a modulated furnace output for directing a control signal to both the modulating valve and the speed control unit associated with the modulated gas valve.

15. The heated air makeup unit of claim 14 wherein the speed control unit is configured to drive the combustion air blower of the modulated gas furnace such that the combustion efficiency of the modulated gas furnace is 83% or more over a range of blower speeds for the combustion air blower.

16. A method of utilizing a heated air makeup unit to heat outside air and direct the heated air into an interior space, the method comprising:
a. directing outside air into and through a heating chamber having a modulated gas furnace and one or more non-modulated gas furnaces, wherein the modulated gas furnace has associated therewith a combustion air blower for supplying combustion air to the modulated gas furnace and wherein each non-modulated gas furnace includes a combustion air blower associated therewith for supplying combustion air to each non-modulated gas furnace;
b. controlling the heating of the air with a controller by varying the heating rate of the modulated gas furnace and from time-to-time actuating or deactuating one or more of the non-modulated gas furnaces and the combustion blowers associated therewith wherein each of the one or more non-modulated gas furnaces is operative to function at a substantially constant heating rate and the modulated gas furnace is operative to function at a varying heating rate;
c. controlling the heating of the air including directing a control signal to one or more of the non-modulated gas furnaces where the control signal is operative to actuate or deactuating the one or more non-modulated gas furnaces;
d. controlling the heating of the air further including directing a second control signal from the controller to both a speed control unit and a modulating valve wherein the modulating valve is associated with the modulated gas furnace and the speed control unit is operatively connected to the combustion air blower associated with the modulated gas furnace for controlling the flow of combustion air to the modulated gas furnace such that by varying and controlling the combustion air directed to the modulated gas furnace and varying and controlling the flow of gas passing from the modulating valve to the modulated gas furnace, the heating rate of the modulated gas furnace is controlled; and e. wherein the control of the one or more non-modulated furnaces provides heating control and controlling and varying the heating rate of the modulated gas furnace provides heating control.

17. A heated air makeup unit for heating outside air and directing the outside air into an interior space, the heated air makeup unit comprising:

a. a housing;

b. a modulated gas furnace disposed in the housing for heating outside air passing through the housing;

c. the modulated gas furnace including a combustion air blower and a modulated gas valve;

d. one or more non-modulated gas furnaces disposed in the housing for heating outside air passing through the housing;

e. each non-modulated gas furnace including a combustion chamber, a gas valve and a combustion air blower wherein the combustion air blower induces combustion air into the combustion chamber of the non-modulated gas furnace;

f. a control system including a controller for:
  i. controlling the combustion blower associated with the modulated gas furnace and varying the rate of combustion air flowing into the modulated gas furnace;
  ii. controlling the modulated gas valve and varying the flow of gas into the modulated gas furnace;
  iii. actuating and deactuating each non-modulated gas furnace by actuating or deactuating the combustion air blower and the gas valve associated with each non-modulated gas furnace; and
  iv. wherein the controller varies the heat rate of the modulated gas furnace and provides on/off control of each of the non-modulated gas furnace.

18. The heated air makeup unit of claim 17 wherein the modulated gas furnace includes a heating capacity range and wherein the controller is operative to vary the heat output of the modulated gas furnace over the heating capacity range, and wherein the controller is operative to actuate at least one of the non-modulated gas furnaces in response to the modulated gas furnace reaching an upper portion of the heating capacity range of the modulated gas furnace.

19. The heated air makeup unit of claim 18 wherein the controller is operative to deactivate one of the non-modulated gas furnaces in response to the modulated gas furnace reaching a lower portion of the heating capacity range of the modulated gas furnace.

20. The heated air makeup unit of claim 18 wherein the controller is operative to actuate one non-modulated gas furnace after another in response to the modulated gas furnace repeatedly, over a selected prior of time, reaching an upper portion of the heating capacity range of the modulated gas furnace.

* * * * *